US007514673B2

(12) United States Patent
Senko et al.

(10) Patent No.: US 7,514,673 B2
(45) Date of Patent: Apr. 7, 2009

(54) ION TRANSPORT DEVICE

(75) Inventors: Michael W. Senko, Sunnyvale, CA (US); Viatcheslav V. Kovtoun, Santa Clara, CA (US)

(73) Assignee: Thermo Finnigan LLC, San Jose, CA (US)

( * ) Notice: Subject to any disclaimer, the term of this patent is extended or adjusted under 35 U.S.C. 154(b) by 178 days.

(21) Appl. No.: 11/764,100

(22) Filed: Jun. 15, 2007

(65) Prior Publication Data

US 2008/0308721 A1 Dec. 18, 2008

(51) Int. Cl.
*H01J 3/14* (2006.01)
*B01D 59/44* (2006.01)

(52) U.S. Cl. ....................... 250/281; 250/282; 250/286; 250/290; 250/396 R

(58) Field of Classification Search ................. 250/281, 250/282, 286, 290, 396 R
See application file for complete search history.

(56) References Cited

U.S. PATENT DOCUMENTS 5,572,035 A 11/1996 Franzen
6,107,628 A 8/2000 Smith et al.
6,417,511 B1 7/2002 Russ, IV et al.
6,583,408 B2 6/2003 Smith et al.
6,727,495 B2 4/2004 Li
6,815,669 B1 * 11/2004 Miller et al. ................ 250/286
6,891,153 B2 5/2005 Bateman et al.
7,064,321 B2 6/2006 Franzen
7,368,709 B2 * 5/2008 Guevremont et al. ....... 250/282
7,459,693 B2 12/2008 Park et al.

FOREIGN PATENT DOCUMENTS

EP 1465234 A3 10/2004

OTHER PUBLICATIONS

Guan et al., "Stacked-Ring Electrostatic Ion Guide," J. Am Soc Mass Spectrom, p. 101-106, (1996).
Giles et al., "Evaluation of a Stacked-Ring Radio Frequency Ion Transmission Device at Intermediate Pressures," Proceedings of the 49th Conf. on Mass Spectrom and Allied Topics, 2 pgs., (May 27-31, 2001).
Giles et al., "Applications of a travelling wave-based radio-frequency-only stacked ring ion guide," Rapid Commun. Mass Spectrom, p. 2401-2414, (2004).
Julian et al., "Ion Funnels for the Masses: Experiments and Simulations with a Simplified Ion Funnel," J. Am Soc Mass Spectrom, p. 1708-1712, (2005).

* cited by examiner

*Primary Examiner*—Nikita Wells
(74) *Attorney, Agent, or Firm*—Charles B. Katz

(57) ABSTRACT

A device for transporting and focusing ions in a low vacuum or atmospheric-pressure region of a mass spectrometer is constructed from a plurality of longitudinally spaced apart electrodes to which oscillatory (e.g., radio-frequency) voltages are applied. In order to create a tapered field that focuses ions to a narrow beam near the device exit, the inter-electrode spacing or the oscillatory voltage amplitude is increased in the direction of ion travel.

28 Claims, 5 Drawing Sheets

ION TRANSPORT DEVICE

FIELD OF THE INVENTION

The present invention relates generally to ion optics for mass spectrometers, and more particularly to a device for confining and focusing ions in a low vacuum region.

BACKGROUND OF THE INVENTION

A fundamental challenge faced by designers of mass spectrometers is the efficient transport of ions from the ion source to the mass analyzer, particularly through atmospheric or low vacuum regions where ion motion is substantially influenced by interaction with background gas molecules. While electrostatic optics are commonly employed in these regions of commercially available mass spectrometer instruments for ion focusing, it is known that the effectiveness of such devices is limited due to the large numbers of collisions experienced by the ions. Consequently, ion transport losses through the low vacuum regions tend to be high, which has a significant adverse impact on the instrument's overall sensitivity.

Various approaches have been proposed in the mass spectrometry art for improving ion transport efficiency in low vacuum regions. One approach is embodied by the ion funnel device described in U.S. Pat. No. 6,107,628 to Smith et al. Roughly described, the ion funnel device consists of a multitude of closely longitudinally spaced ring electrodes having apertures that decrease in size from the entrance of the device to its exit. The electrodes are electrically isolated from each other, and radio-frequency (RF) voltages are applied to the electrodes in a prescribed phase relationship to radially confine the ions to the interior of the device. The relatively large aperture size at the device entrance provides for a large ion acceptance area, and the progressively reduced aperture size creates a "tapered" RF field having a field-free zone that decreases in diameter along the direction of ion travel, thereby focusing ions to a narrow beam which may then be passed through the aperture of a skimmer or other electrostatic lens without incurring a large degree of ion losses. Refinements to and variations on the ion funnel device are described in (for example) U.S. Pat. No. 6,583,408 to Smith et al., U.S. Pat. No. 7,064,321 to Franzen, EP application Ser. No. 1,465,234 to Bruker Daltonics, and Julian et al., "Ion Funnels for the Masses: Experiments and Simulations with a Simplified Ion Funnel", J. Amer. Soc. Mass Spec., vol. 16, pp. 1708-1712 (2005).

While the ion funnel device has been used successfully in research environments, its implementation in commercial mass spectrometer instruments may be hindered by issues of cost and manufacturability. A typical ion funnel utilizes approximately 100 ring electrodes, each having a unique aperture diameter. This design results in a high part count and elevated manufacturing cost and complexity. Furthermore, the use of a large number of ring electrodes creates a very high capacitive load, which requires a high-power amplifier to drive the circuit.

SUMMARY

In accordance with one embodiment of the invention, an ion transport device is provided consisting of a plurality of apertured electrodes which are spaced apart along the longitudinal axis of the device. The electrode apertures define an ion channel along which ions are transported between an entrance and an exit of the device. An oscillatory (e.g., RF) voltage source, coupled to the electrodes, supplies oscillatory voltages in an appropriate phase relationship to the electrodes to radially confine the ions. In order to provide focusing of ions to the centerline of the ion channel near the device exit, the spacing between adjacent electrodes increases in the direction of ion travel. The relatively greater inter-electrode spacing near the device exit provides for proportionally increased oscillatory field penetration, thereby creating a tapered field that concentrates ions to the longitudinal centerline. A longitudinal DC field, which assists in propelling ions along the ion channel, may be created by applying a set of DC voltages to the electrodes.

In accordance with a second embodiment of the invention, an ion transport device includes a plurality of regularly-spaced apertured electrodes having oscillatory voltages applied thereto. The tapered field for focusing the ions to the ion channel centerline is generated by increasing the amplitude of the oscillatory voltage in the direction of ion travel.

In either embodiment, transmission of clusters or neutrals to the downstream, lower-pressure regions of the mass spectrometer may be reduced by laterally offsetting the electrode apertures relative to each other such that the ion channel is curved or S-shaped.

DETAILED DESCRIPTION OF EMBODIMENTS

Figure 1:
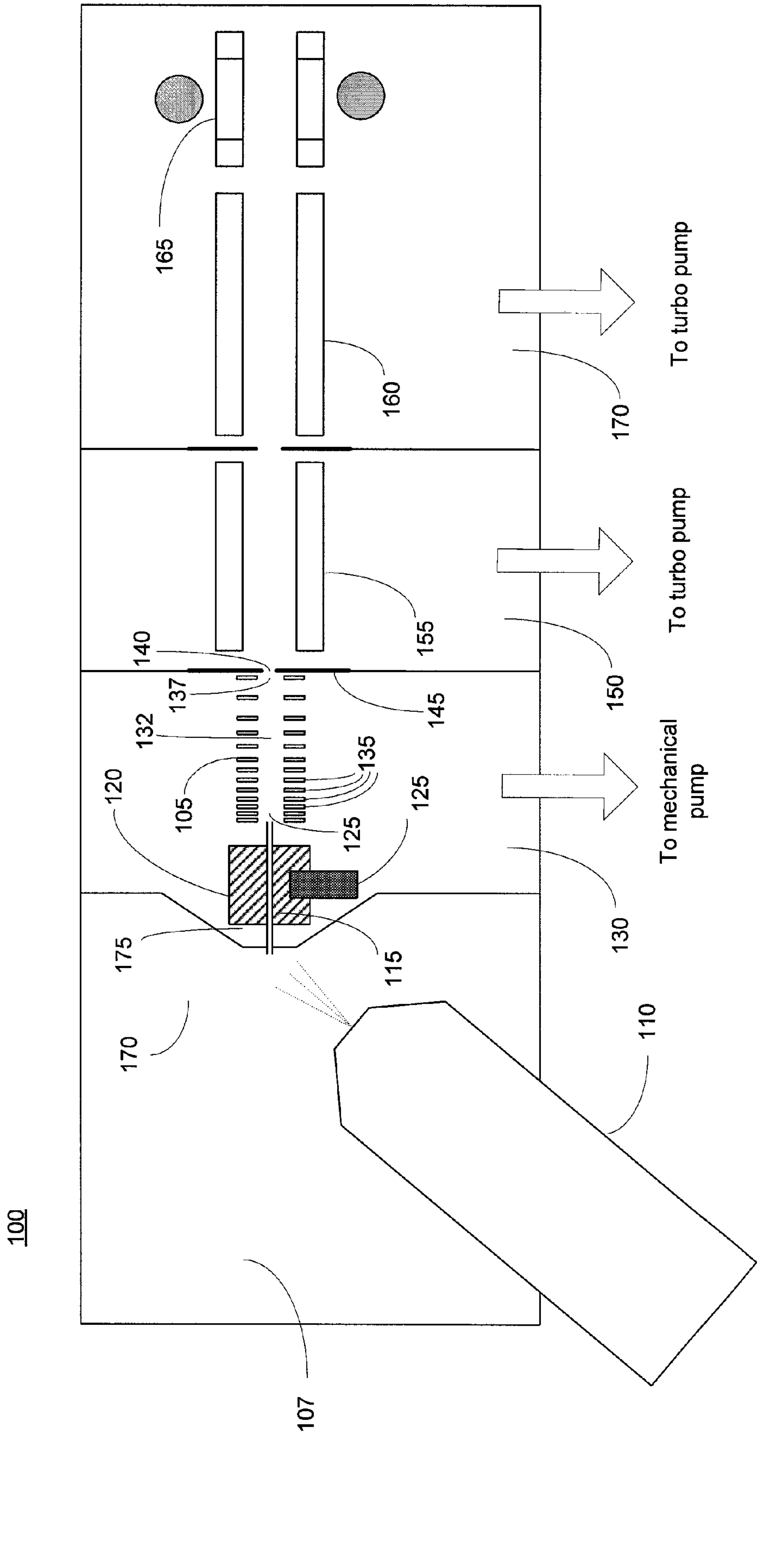
FIG. 1 is a schematic depiction of a mass spectrometer incorporating an ion transport device constructed in accordance with a first embodiment of the invention, wherein electrode spacing is increased in the direction of ion travel to create a tapered focusing field.

FIG. 1 is a schematic depiction of a mass spectrometer 100 incorporating an ion transport device 105 constructed in accordance with a first embodiment of the invention. Analyte ions may be formed by electrospraying a sample solution into an ionization chamber 107 via an electrospray probe 110. For an ion source that utilizes the electrospray technique, ionization chamber 107 will generally be maintained at or near atmospheric pressure. The analyte ions, together with background gas and partially desolvated droplets, flow into the inlet end of a conventional ion transfer tube 115 (a narrow-bore capillary tube) and traverse the length of the tube under the influence of a pressure gradient. In order to increase ion throughput from ionization chamber 107, multiple capillary tubes (or an ion transfer tube with multiple channels) may be substituted for the single channel ion transfer tube depicted herein. Analyte ion transfer tube 115 is preferably held in good thermal contact with a block 120 that is heated by cartridge heater 125. As is known in the art, heating of the ion/gas stream passing through ion transfer tube 115 assists in the evaporation of residual solvent and increases the number of analyte ions available for measurement. The analyte ions emerge from the outlet end of ion transfer tube 115, which opens to an entrance 127 of the ion transport device 105 located within low vacuum chamber 130. As indicated by the arrow, chamber 130 is evacuated to a low vacuum pressure by a mechanical pump or equivalent. Under typical operating conditions, the pressure within low vacuum chamber will be in the range of 1-10 Torr (approximately 1-10 millibar), but it is believed that an ion transport device according to embodiments of the present invention may be successfully operated over a broad range of low vacuum and atmospheric pressures, e.g., between 0.1 millibar and 1 bar.

It should be understood that the electrospray ionization source depicted and described herein is presented by way of an illustrative example, and that the ion transport device of the present invention should not be construed as being limited to use with an electrospray or other specific type of ionization source. Other ionization techniques that may be substituted for (or used in addition to) the electrospray source include chemical ionization, photo-ionization, and laser desorption or matrix-assisted laser desorption/ionization (MALDI).

The analyte ions exit the outlet end of ion transfer tube 115 as a free jet expansion and travel through an ion channel 132 defined within the interior of ion transport device 105. As will be discussed in further detail below, radial confinement and focusing of ions within ion channel 132 are achieved by application of oscillatory voltages to apertured electrodes 135 of ion transport device 105. As is further discussed below, transport of ions along ion channel 132 to device exit 137 may be facilitated by generating a longitudinal DC field and/or by tailoring the flow of the background gas in which the ions are entrained. Ions leave ion transport device 105 as a narrowly focused beam and are directed through aperture 140 of extraction lens 145 into chamber 150. The ions pass thereafter through ion guides 155 and 160 and are delivered to a mass analyzer 165 (which, as depicted, may take the form of a conventional two-dimensional quadrupole ion trap) located within chamber 170. Chambers 150 and 170 may be evacuated to relatively low pressures by means of connection to ports of a turbo pump, as indicated by the arrows.

Figure 2:
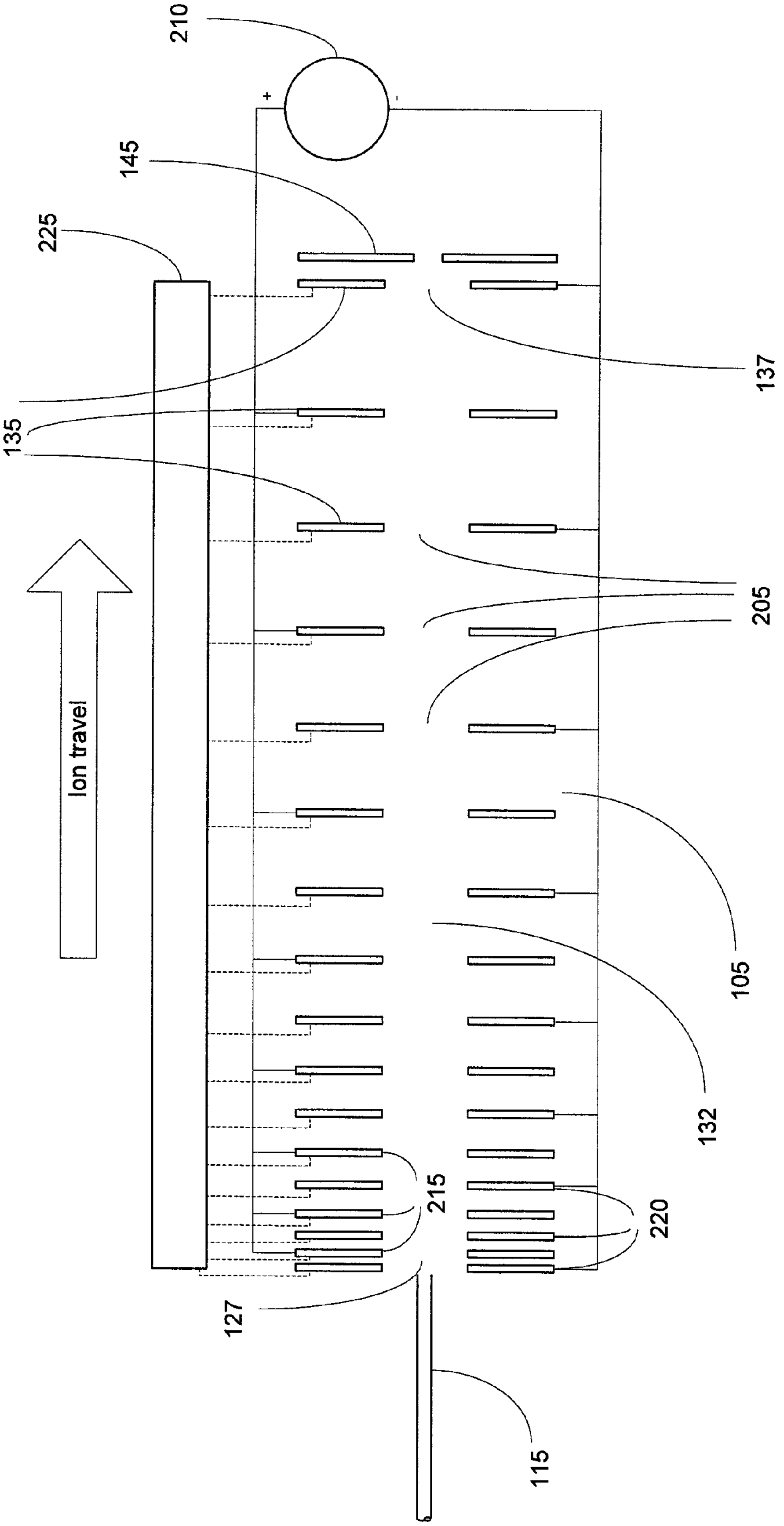
FIG. 2 depicts in greater detail the ion transport device used in the mass spectrometer of FIG. 1.

FIG. 2 depicts (in rough cross-sectional view) details of ion transport device 105. Ion transport device 105 is formed from a plurality of generally planar electrodes 135 arranged in longitudinally spaced-apart relation (as used herein, the term "longitudinally" denotes the axis defined by the overall movement of ions along ion channel 132). Devices of this general construction are sometimes referred to in the mass spectrometry art as "stacked-ring" ion guides. Each electrode 135 is adapted with an aperture 205 through which ions may pass. The apertures collectively define an ion channel 132, which may be straight or (as discussed below in connection with FIG. 4) curved, depending on the lateral alignment of the apertures. To improve manufacturability and reduce cost, all of the electrodes 135 may have identically sized apertures 205 (in contradistinction to the device disclosed in the aforementioned U.S. Pat. No. 6,107,628 to Smith et al., wherein each electrode possesses a uniquely sized aperture). An oscillatory (e.g., radio-frequency) voltage source 210 applies oscillatory voltages to electrodes 135 to thereby generate a field that radially confines ions within ion channel 132. According to a preferred embodiment, each electrode 135 receives an oscillatory voltage that is equal in amplitude and frequency but opposite in phase to the oscillatory voltage applied to the adjacent electrodes. As depicted, electrodes 135 may be divided into a plurality of first electrodes 215 interleaved with a plurality of second electrodes 220, with the first electrodes 215 receiving an oscillatory voltage that is opposite in phase with respect to the oscillatory voltage applied to the second electrodes 220. In a typical implementation, the frequency and amplitude of the applied oscillatory voltages are 0.5-1 MHz and 50-400 Vp-p (peak-to-peak), the required amplitude being strongly dependent on frequency. It should be noted that the number of electrodes 135 depicted in the figures has been chosen arbitrarily, and should not be construed to limit the invention to any particular number of electrodes. Typical implementations of an ion transport device having a length of 50 mm will have between 12 and 24 electrodes. Due to the increased inter-electrode spacing near the device exit, an ion transport device constructed in accordance with this embodiment of the invention will generally utilize fewer electrodes relative to the conventional ion funnel device described in U.S. Pat. No. 6,107,628 to Smith et al. and the related publications cited above.

To create a tapered electric field that focuses the ions to a narrow beam proximate device exit 137, the longitudinal spacing of electrodes 135 increases in the direction of ion travel. It is known in the art (see, e.g., U.S. Pat. No. 5,572,035 to Franzen as well as the aforementioned Julian et al. article) that the radial penetration of an oscillatory field in a stacked ring ion guide is proportional to the inter-electrode spacing. Near entrance 127, electrodes 135 are relatively closely spaced, which provides limited radial field penetration, thereby producing a wide field-free region around the longitudinal axis. This condition promotes high efficiency of acceptance of ions flowing from ion transfer tube 115 into ion channel 132. Furthermore, the close spacing of electrodes near entrance 127 produces a strongly reflective surface and shallow pseudo-potential wells that do not trap ions of a diffuse ion cloud. In contrast, electrodes 135 positioned near exit 137 are relatively widely spaced, which provides effective focusing of ions (due to the greater radial oscillatory field penetration and narrowing of the field-free region) to the central longitudinal axis. It is believed that the relatively wide inter-electrode spacing near device exit 137 will not cause significant ion loss, because ions are cooled toward the central axis as they travel along ion channel 132. In one exemplary implementation of ion transport device 105, the longitudinal inter-electrode spacing (center-to center) varies from 1 mm at device entrance 127 to 5 mm at device exit 137.

In the FIG. 2 embodiment, the electrode spacing is depicted as gradually and continually increasing in the direction of ion travel along the full length of ion transport device 105. In other implementations, electrode spacing may be regular along one or more segments of the ion transport device length (e.g., proximate to the device entrance), and then increase along another segment (e.g., proximate to the device exit). Furthermore, certain implementations may utilize a design in which the electrode spacing increases in a stepped rather than gradual manner.

Ions traveling through ion transport device 105 may become stalled (i.e., trapped within wells between electrodes) if they do not possess sufficient kinetic energy to overcome the pseudo-potential barriers. To avoid this problem, a longitudinal DC field may be created within ion channel 132 by providing a DC voltage source 225 that applies a set of DC voltages to electrodes 135. The applied voltages increase or decrease in the direction of ion travel, depending on the polarity of the transported ions. The longitudinal DC field assists in propelling ions toward device exit 137 and ensures that undesired trapping does not occur. Under typical operating conditions, a longitudinal DC field gradient of 1-2V/mm is sufficient to eliminate stalling of ions within ion transfer device 105. In alternate embodiments, a longitudinal DC field may be generated by applying suitable DC voltages to auxiliary electrodes (e.g., a set of resistively-coated rod electrodes positioned outside the ring electrodes) rather than to ring electrodes 135.

Figure 3:
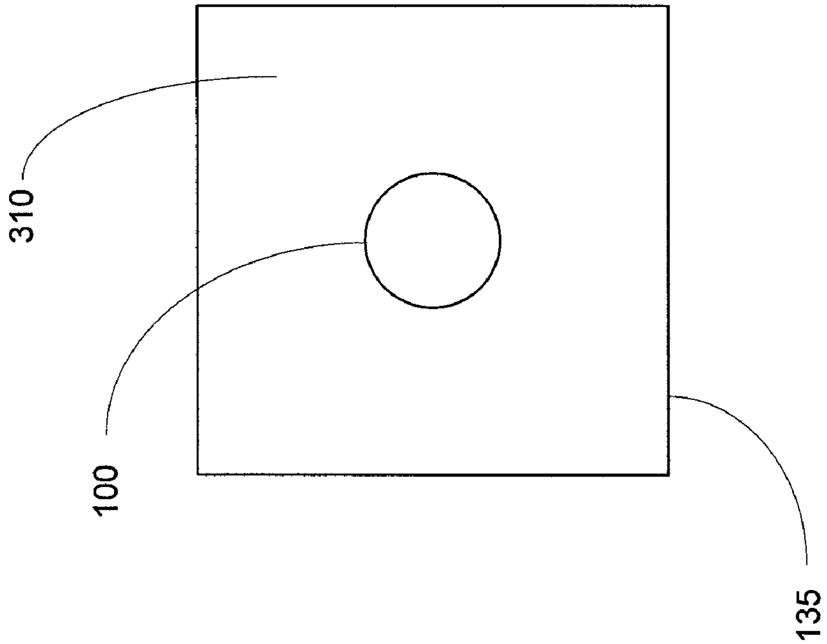
FIG. 3 depicts an example of an apertured electrode used in the ion transport device of FIG. 2.

As shown in FIG. 3, each electrode 135 may consist of a square plate 310 adapted with a centrally located circular aperture 205. As noted above, part count and manufacturing costs may be reduced by utilizing interchangeable electrodes of identical dimensions and aperture size. Plate 310 may be wholly fabricated from an electrically conductive material, such as stainless steel or brass. In an alternative construction, the electrode may be formed by depositing (to an appropriate thickness and over a suitable area) a conductive material on the central region (i.e., the region radially adjacent to the aperture) of an insulative substrate, such as that used for printed circuit boards. A set of conductive traces may also be deposited between the central region and the edge of the plate to establish electrical connections to the oscillatory and/or DC voltage sources. In a typical implementation of ion transport device 105, each electrode 135 has lateral dimensions of 25 mm by 25 mm, a thickness of 0.5 mm, and a circular aperture 205 having a diameter of 7-15 mm.

Figure 4:
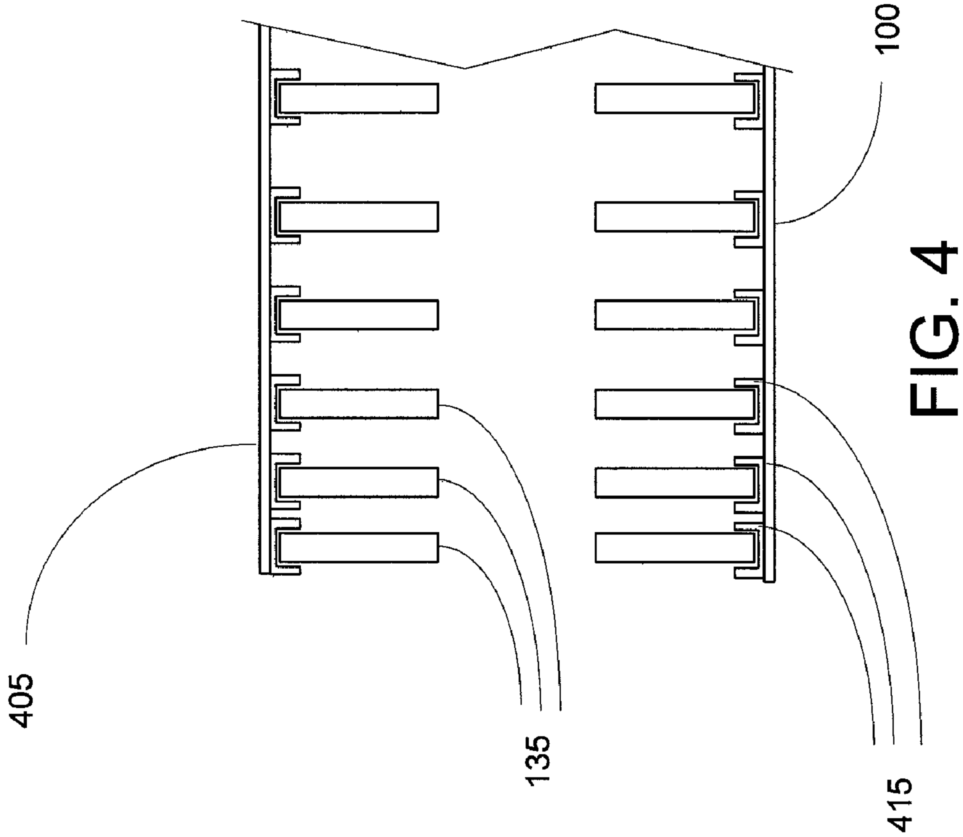
FIG. 4 depicts a portion of an ion transport device having an enclosure to promote gas-assisted ion transport.

Ion transport device 105 may be constructed in an open configuration, as shown in FIG. 2, whereby the gaps between electrodes 135 are open to and communicate with chamber 130. This design allows gas from the ion/gas stream to be removed through the gaps between the electrodes. Electrodes 135 may be assembled and aligned to each other and fixed at the prescribed inter-electrode spacings using a set of insulative support rods and spacers, in the manner described in U.S. Pat. No. 6,107,628 to Smith et al. In an alternative implementation, all or a portion of electrodes 135 may be located within an enclosure, which obstructs the direct outflow of gas from the inter-electrode gaps to chamber 130 and thereby preserves a relatively high gas flow along the enclosed portion of the ion channel. This gas flow assists in the transport of ions along the ion channel and may avoid the need to provide a longitudinal DC field of the type described above. Referring to FIG. 4, an enclosure 405 may be formed from a rectilinear arrangement of plates 410. Electrodes 205 may be mounted within enclosure 405 using edge connectors 415, which fix the inter-electrode spacing at the desired values and provide connections for the oscillatory and optional DC voltages.

Figure 5:
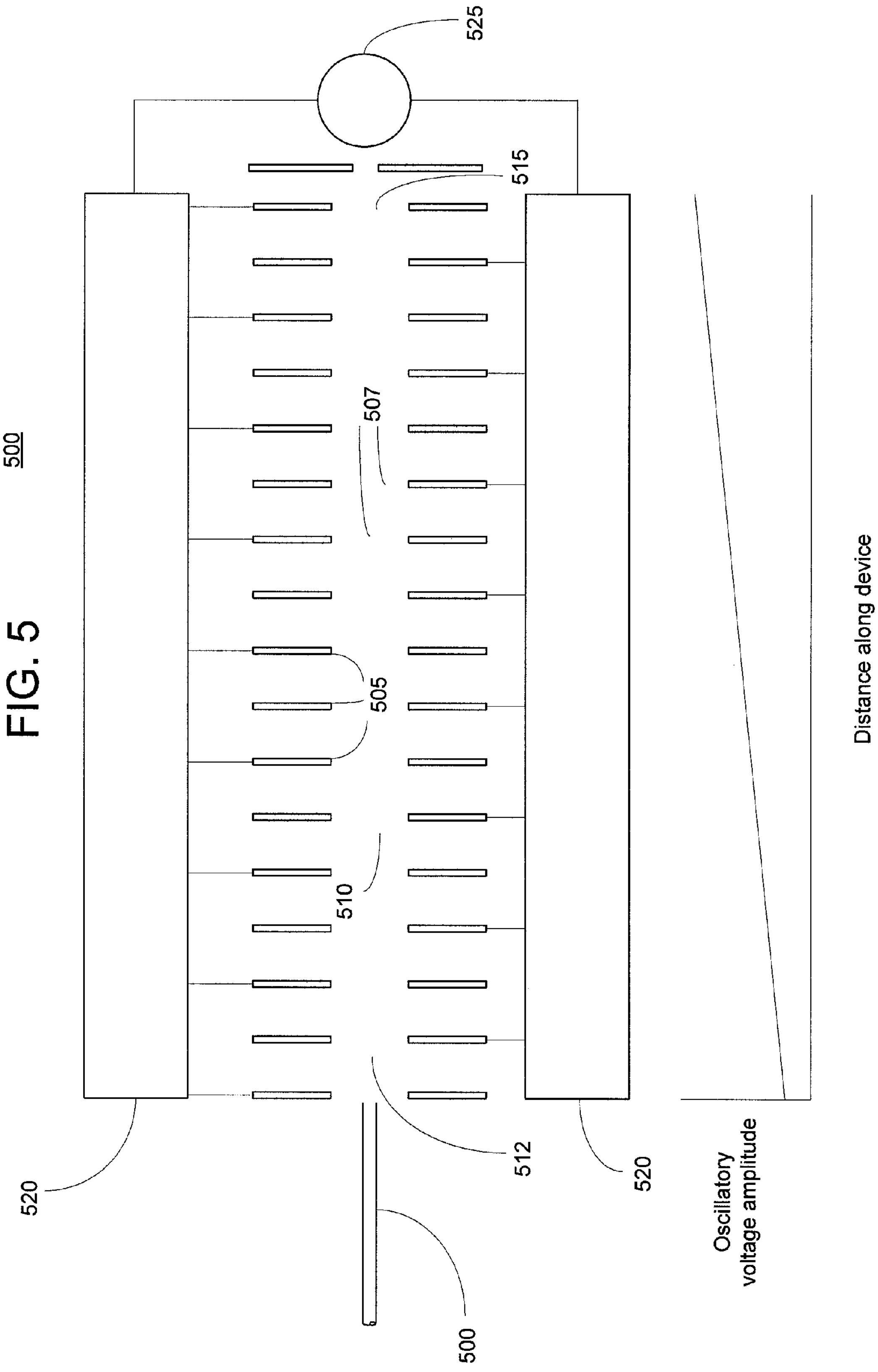
FIG. 5 depicts a second embodiment of the ion transport device, wherein a tapered focusing field is created by increasing the amplitude of the applied oscillatory voltage in the direction of ion travel.

FIG. 5 depicts an ion transport device 500 constructed in accordance with a second embodiment of the invention. In contrast to the FIG. 2 embodiment, electrodes 505, each of which is adapted with an identically sized aperture 507, are regularly spaced along the longitudinal axis. The electrodes 505 collectively define an ion channel 510. To generate the tapered radial field that promotes a high ion acceptance efficiency at device entrance 512 and tight focusing of the ion beam at device exit 515, the amplitude of oscillatory voltages applied to electrodes 505 increase in the direction of ion travel, such that each electrode 505 receives an oscillatory voltage of greater amplitude relative to electrodes in the upstream direction. This increase in oscillatory voltage amplitude is represented by the graph depicted in FIG. 5. The desired oscillatory voltages may be delivered through a set of attenuator circuits 520 coupled to oscillatory voltage source 525. In one implementation of ion transport device 500, electrodes 505 are spaced on 1-1.5 mm centers, and the oscillatory voltage has a frequency of 0.5-1 MHz and a amplitude that varies from 50-100Vp-p at device entrance 510 to 400-600 Vp-p at device exit 515. The required maximum amplitude of the applied oscillatory voltage is dependent on the inter-electrode spacing, and may be reduced by utilizing a wider spacing (e.g., spacing on 4 mm centers may reduce the maximum applied voltage to 100Vp-p). A DC voltage source (not depicted), coupled to electrodes 505, may apply a set of DC voltages in the manner described above in connection with the FIG. 2 embodiment to generate a longitudinal DC field gradient that assists to propel ions along ion channel 510. Alternatively or additionally, longitudinal ion transport through the device may be facilitated by locating electrodes 505 within an enclosure, such that a relatively high gas flow rate is maintained within ion channel 510.

Figure 6:
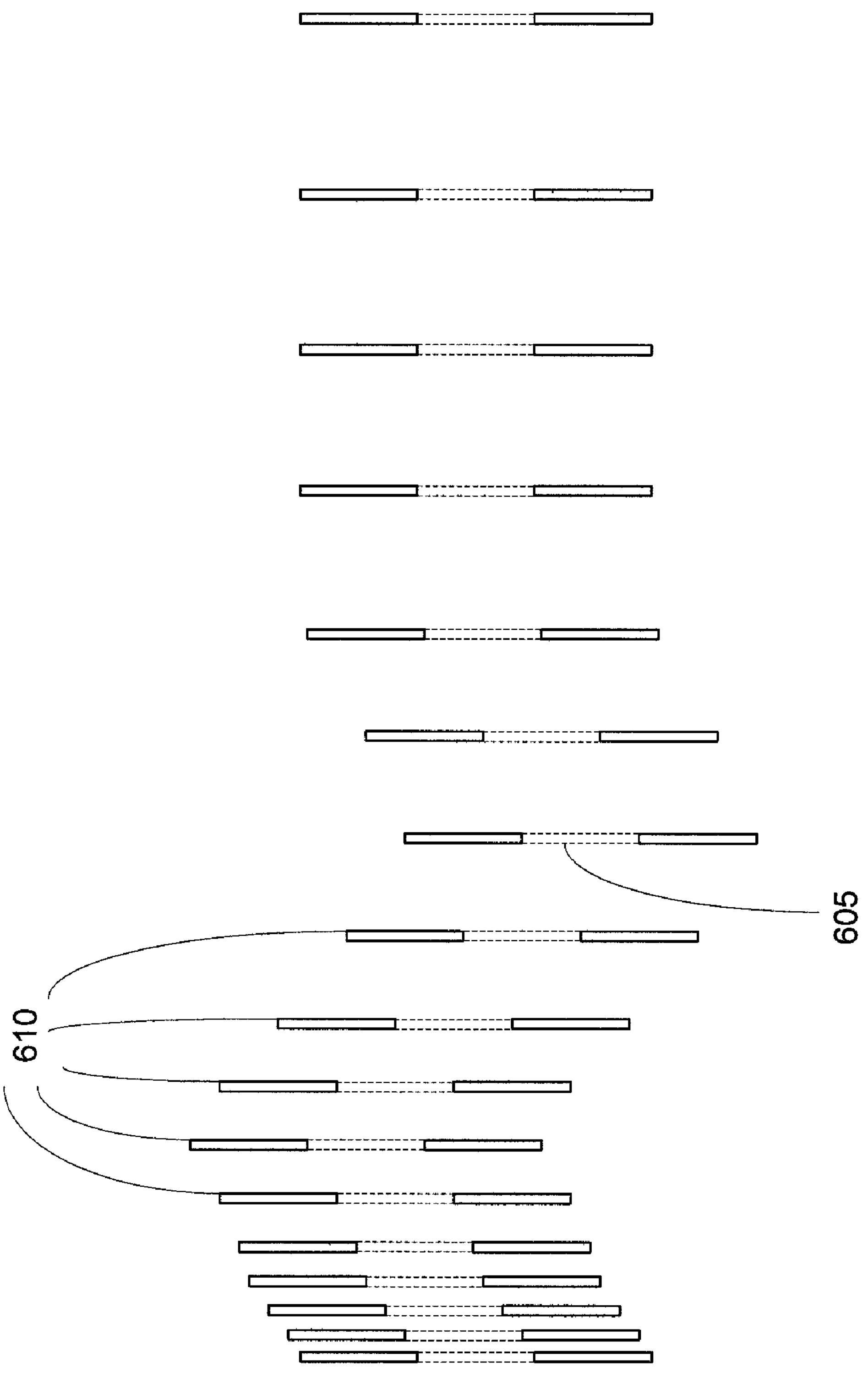
FIG. 6. depicts another implementation of the ion transport device, in which the apertures of the electrodes are laterally offset to define an S-shaped ion channel.

The ion transport devices 105 and 500 of FIGS. 2 and 5 are depicted as having substantially straight ion channels. However, it may be advantageous to arrange the electrodes so as to define a curved ion channel in order to reduce streaming of neutral gas molecules into the lower-pressure regions of the mass spectrometer and reduce pumping requirements. Referring to FIG. 6, an S-shaped ion channel 605 is defined by laterally offsetting each electrode 610 with respect to the adjacent electrodes. Unlike ions, the trajectories of neutrals (together with undesolvated droplets and other high-mass particles) entering ion channel 605 are not affected by the resultant laterally shifting electric fields, and so the neutrals tend to collide with the solid surfaces of electrodes and are subsequently pumped away (e.g., through gaps between electrodes). While ion channel 605 is depicted as having an S-shape, other implementations may utilize an arcuate ion channel whereby the apertures of the first and final electrodes are not necessarily aligned along the principal flow axis of the mass spectrometer. Inhibition of neutral gas flow through the ion channel may also be accomplished using the jet disturber structure disclosed in U.S. Pat. No. 6,583,408, which consists essentially of a solid plate positioned in the ion/gas flow axis.

It should be recognized that the techniques for generating a tapered radial field embodied by the FIG. 2 and FIG. 5 embodiments may be utilized separately or in combination, i.e., an ion transport device may include one or both of longitudinally increasing electrode spacing or longitudinally increasing oscillatory voltage amplitude to create the tapered field. Furthermore, one or both of these techniques may be combined with the physical taper technique (i.e., longitudinally decreasing aperture size) embodied by the device disclosed in U.S. Pat. No. 6,107,628 to Smith et al.

It is to be understood that while the invention has been described in conjunction with the detailed description thereof, the foregoing description is intended to illustrate and not limit the scope of the invention, which is defined by the scope of the appended claims. Other aspects, advantages, and modifications are within the scope of the following claims.

What is claimed is:

1. An ion transport device, comprising:

a plurality of longitudinally spaced apart electrodes defining an ion channel along which ions are transported, each of the plurality of electrodes being adapted with an aperture through which ions may travel; and an oscillatory voltage source configured to apply oscillatory voltages to at least a portion of the plurality of electrodes;

wherein at least one of (i) the spacing between adjacent electrodes, and (ii) the amplitude of the applied oscillatory voltages increases in the direction of ion travel.

2. The ion transport device of claim 1, wherein only the spacing between adjacent electrodes increases in the direction of ion travel.

3. The ion transport device of claim 1, wherein only the amplitude of the applied oscillatory voltages increases in the direction of ion travel.

4. The ion transport device of claim 1, further comprising means for generating a longitudinal DC field within the ion channel to assist in the transport of ions between an entrance and an exit of the ion channel.

5. The ion transport device of claim 4, wherein the means for generating the longitudinal DC field includes a DC voltage source configured to apply a set of DC voltages to at least a portion of the plurality of electrodes.

6. The ion transport device of claim 1, wherein the apertures of the plurality of electrodes are aligned to define a substantially straight ion channel.

7. The ion transport device of claim 1, wherein at least some of the apertures of ones of the plurality of electrodes are laterally offset with respect to apertures of adjacent electrodes, such that no direct line of sight exists between an entrance and an exit of the ion channel.

8. The ion transport device of claim 7, wherein the ion channel is S-shaped.

9. The ion transport device of claim 7, wherein the ion channel is arcuate.

10. The ion transport device of claim 1, further comprising a jet disruptor interposed between two adjacent electrodes.

11. The ion transport device of claim 2, wherein the spacing between adjacent electrodes increases gradually in the direction of ion travel.

12. The ion transport device of claim 3, wherein the amplitude of the applied oscillatory voltages increases gradually in the direction of ion travel.

13. The ion transport device of claim 1, wherein the oscillatory voltage source is a radio-frequency voltage source.

14. The ion transport device of claim 1, wherein the plurality of electrodes includes a plurality of first electrodes arranged in interleaved relation with a plurality of second electrodes, the oscillatory voltage applied to the first electrodes being opposite in phase to the oscillatory voltage applied to the second electrodes.

15. The ion transport device of claim 1, wherein the apertures of the plurality of electrodes are identically sized.

16. The ion transport device of claim 1, wherein at least a portion of the plurality of electrodes are held within an enclosure that inhibits outflow of gas through gaps between electrodes.

17. A mass spectrometer, comprising:

an ion source;

a mass analyzer; and an ion transport device located intermediate in an ion path between the ion source and the mass analyzer, the ion transport device including:

a plurality of longitudinally spaced apart electrodes defining an ion channel along which ions are transported, each of the plurality of electrodes being adapted with an aperture through which ions may travel; and an oscillatory voltage source configured to apply oscillatory voltages to at least a portion of the plurality of electrodes;

wherein at least one of (i) the spacing between adjacent electrodes and (ii) the amplitude of the applied oscillatory voltages increases in the direction of ion travel.

18. The mass spectrometer of claim 17, wherein only the spacing between adjacent electrodes increases in the direction of ion travel.

19. The mass spectrometer of claim 17, wherein only the amplitude of the applied oscillatory voltages increases in the direction of ion travel.

20. The mass spectrometer of claim 17, further comprising means for generating a longitudinal DC field within the ion channel to assist in the transport of ions between an entrance and an exit of the ion channel.

21. The mass spectrometer of claim 20, wherein the means for generating the longitudinal DC field includes a DC voltage source configured to apply a set of DC voltages to at least a portion of the plurality of electrodes.

22. The mass spectrometer of claim 17, wherein at least some of the apertures of ones of the plurality of electrodes are laterally offset with respect to apertures of adjacent electrodes, such that no direct line of sight exists between an entrance and an exit of the ion channel.

23. The mass spectrometer of claim 17, wherein the ion transport device is located within a chamber, and further comprising a pump in communication with the chamber for maintaining the pressure within the chamber between 0.1 and 10 Torr.

24. The mass spectrometer of claim 17, further comprising at least one elongated capillary for carrying ions from the ion source to the entrance of the ion transport device.

25. The mass spectrometer of claim 24, wherein the at least one elongated capillary includes multiple parallel flow channels.

26. A method for transporting and focusing ions within a low vacuum or atmospheric pressure region of a mass spectrometer, comprising:

providing a plurality of longitudinally spaced apart electrodes having apertures, the electrodes defining an ion channel along which ions travel; and applying oscillatory voltages to the plurality of electrodes to generate an electric field that radially confines ions within the ion channel; and increasing the radial electric field penetration in the direction of ion travel by effecting at least one of (i) increasing the longitudinal spacing between adjacent electrodes in the direction of ion travel or (ii) increasing the amplitude of the applied oscillatory voltages in the direction of ion travel.

27. The method of claim 26, wherein the size of the apertures gradually decreases in the direction of ion travel for at least a portion of the plurality of electrodes.

28. The method of claim 26, further comprising a step of generating a longitudinal DC field to assist in the transport of ions along the ion channel.

* * * * *